(12) United States Patent
Boll

(10) Patent No.: US 9,041,624 B2
(45) Date of Patent: May 26, 2015

(54) METHOD AND APPARATUS FOR THREE-DIMENSIONAL DISPLAY OF IMAGES

(76) Inventor: Peter Boll, Weilheim (DE)

( * ) Notice: Subject to any disclaimer, the term of this patent is extended or adjusted under 35 U.S.C. 154(b) by 2204 days.

(21) Appl. No.: 10/557,597

(22) PCT Filed: May 21, 2004

(86) PCT No.: PCT/EP2004/005509
§ 371 (c)(1),
(2), (4) Date: Dec. 1, 2006

(87) PCT Pub. No.: WO2004/105403
PCT Pub. Date: Dec. 2, 2004

(65) Prior Publication Data
US 2007/0070062 A1    Mar. 29, 2007

(30) Foreign Application Priority Data
May 23, 2003  (DE) .................................. 103 23 462

(51) Int. Cl.
*G09G 3/00* (2006.01)
*H04N 13/04* (2006.01)

(52) U.S. Cl.
CPC .................................. *H04N 13/0493* (2013.01)

(58) Field of Classification Search
CPC .......... H04N 13/0493; H04N 13/0497; H04N 13/0418; H04N 13/0459; G02B 27/2285; G02B 27/22; G09G 3/003; G09G 3/002; G09G 3/005; G03B 21/562
USPC ........................................ 345/6, 32; 348/744
See application file for complete search history.

(56) References Cited

U.S. PATENT DOCUMENTS

| 5,311,220 | A | * | 5/1994 | Eichenlaub | ..................... 348/55 |
| 5,833,903 | A | * | 11/1998 | Centofante | ................... 264/155 |
| 6,005,608 | A |  | 12/1999 | Chakrabarti |  |
| 6,302,542 | B1 |  | 10/2001 | Tsao |  |
| 6,646,623 | B1 | * | 11/2003 | Chakrabarti | ...................... 345/6 |
| 6,801,185 | B2 | * | 10/2004 | Salley | .......................... 345/102 |

FOREIGN PATENT DOCUMENTS

| EP | 1 302 812 A2 | 4/2003 |
| WO | 02/21851 A2 | 3/2002 |

OTHER PUBLICATIONS

Patent Abstracts of Japan, 56113116A, published Sep. 5, 1981; Japanese Patent Office.
Patent Abstracts of Japan, 57062020A, published Apr. 14, 1982; Japanese. Patent Office.
Patent Abstracts of Japan, 07333546A, published Dec. 22, 1995; Japanese Patent Office.

* cited by examiner

*Primary Examiner* — Stephen Sherman
(74) *Attorney, Agent, or Firm* — Bacon & Thomas, PLLC

(57) ABSTRACT

A method and device for three-dimensionally depicting images, in which a sequence of two-dimensional individual images are produced by means of a two-dimensional array, which consists of individually controllable light-emitting diodes (LED's) and which focuses light emitted by the LED's of the array onto a projection device. The light striking the projection device is focused onto a diffusing screen. While coupled to one another, the projection device and the diffusing screen are moved in a periodically reversing manner in a direction that is essentially perpendicular to the screen plane, and the sequence of two-dimensional individual images are synchronized with the spatial position of the diffusing screen.

19 Claims, 3 Drawing Sheets

METHOD AND APPARATUS FOR THREE-DIMENSIONAL DISPLAY OF IMAGES

FIELD OF THE INVENTION

The invention relates to a method and an apparatus for three-dimensional display of images, in particular for displaying computer generated images.

BACKGROUND OF THE INVENTION

In many fields of science, technology and entertainment, images, image sequences or films are currently being displayed on two-dimensional surfaces, for example the display screens of computer monitors or of television sets. Spatial depth can be simulated in the case of such two-dimensional displays only by perspective displays.

There is thus a need in many fields to display spatial objects as true three-dimensional images that can, for example, also be viewed from different directions and therefore possess a substantially higher information content than the purely two-dimensional display. True three-dimensional images therefore offer not only a more realistic visual impression in films or video games, but can be used advantageously, in particular, even in science and technology. Mention may be made by example of the three-dimensional display of complex protein structures or the three-dimensional display of organs or entire body areas that are calculated from data obtained by NMR tomography or computer tomography. Mention may be made as a further example of the three-dimensional display of radar images that, by contrast with the customary two-dimensional display, is attended by a decisive improvement in safety, since height information is to be seen in a directly visual fashion and need no longer be coded by numerical codes in the two-dimensional display.

In the meantime, numerous methods and apparatuses have become known that are intended to convey the impression of a three-dimensional image to the viewer. In accordance with a widespread method, an attempt is made to use technical aids to simulate the three-dimensional impression of the surroundings caused by human binocular vision. In this case, two images that correspond to sightlines slightly offset from one another and, for example, had been taken by stereophotography or generated by computer, are projected onto a screen. Suitable aids such as polarization or color filter spectacles ensure that the viewer sees only one of the two images with each eye. The three-dimensional effect thus simulated does not convey any additional information for the viewer that goes beyond the spatial depth. Thus, for example, the viewer is not able to view the scene being displayed from a new viewing angle by changing his position.

Moreover, many users find the necessity of wearing special spectacles irksome.

Raster image walls, in the case of which, at a specific distance, the viewer respectively sees with one eye only the image strips belonging to the left- or right-hand image, manage without such an aid. Here, as well, the viewer is incapable of changing position.

U.S. Pat. No. 6,005,608 describes a three-dimensional display apparatus that enables the display of true three-dimensional images that can be perceived by the viewer without special aids such as polarization or color filter spectacles. In this case, the two-dimensional image of a picture tube is projected onto a screen moving perpendicular to the image plane of the picture tube. The dimensions of the two-dimensional image source correspond here to the length and width of the volume displayed, while the movement amplitude of the screen perpendicular to this plane corresponds to the depth of the volume displayed. The contours, produced at each instant by the picture tube, of the three-dimensional image to be displayed are synchronized with the instantaneous spatial position of the screen. However, such an imaging system has a very low aperture, since the projection of the picture tube onto the screen is performed via a shadow mask and can therefore be operated only given a low level of ambient light.

A similar principle forms the basis of the 3-D display screen system marketed by the American company of Actuality Systems and described, for example, in the International patent application WO 02/21851, in the case of which a light beam is projected onto a rotating screen via a scanner optics. The 3-D display screen of the Actuality Systems company is very heavy and expensive because of the complicated mechanism. In addition, the image resulting from the deflection of a single light beam in order to produce images has a very low light level and can be viewed only in darkened rooms.

An apparatus for three-dimensional display of images is described in Japanese patent application JP 56-113116 A. In accordance with this document, two-dimensional individual images are projected onto a screen via an imaging device moving periodically to and fro together with the screen. However, it is possible with this known apparatus to build up the three-dimensional image only with four individual images that are projected onto the screen by four separate projectors, the respectively active projector being controlled via switches that are actuated depending on the instantaneous position of the imaging lens. Since the depth information is restricted to only four different two-dimensional individual images, the quality of the spatial display is not satisfactory. A change in the two-dimensional image information, or even the three-dimensional display of moving scenes is impossible with this apparatus. Moreover, the imaging of a two-dimensional individual image onto a screen with the aid of a projector leads to substantial restrictions with regard to the viewing angle under which the image on the screen can still be perceived in adequate brightness. In any event, taking account of the performance of conventional projectors it may be assumed that observing the image requires the room to be extensively darkened.

Again, an apparatus for producing three-dimensional images is described in Japanese patent application JP 57-062020 A. In accordance with this document, images are produced by moving an array composed of light-emitting diodes (LED array) back and forward. In the case of the apparatus described, the entire array must be moved together with the circuit electronics for controlling the array such that high forces act on the array itself, on the drive and on the mechanical guide. Japanese patent application JP 07-33546A describes a further apparatus for producing three-dimensional images. In the case of the apparatus described there, the images are produced by three linear LED arrays that are arranged offset from one another, the offsetting of the three linear arrays defining the maximum possible image depth. Three flat images are produced in each case from the three depth staggered image lines by moving a mirror. In the case of this apparatus, as well, the viewer has available only a very restricted number of depth information items, and so it is not possible to talk of a true production of three-dimensional images.

SUMMARY OF THE INVENTION

The present invention is therefore based on the technical problem of providing a method and an apparatus for three-dimensional display of images, in particular for three-dimensional display of variable images, which can be viewed like a true object from various directions of view, the aim being for the images to have a substantially higher level of intensity than previously known 3-D displays. The apparatus according to the invention is intended here to be suitable for mass production and be capable of being produced in a correspondingly cost-effective way.

The invention therefore relates to a method for three-dimensional display of images, in which a sequence of two-dimensional individual images are produced by means of a two-dimensional array of individually controllable light emitting diodes (LEDs), which method focuses light emanating from the LEDs of the array onto an imaging device that focuses light incident on the imaging device onto a diffusion screen, the imaging device and the diffusion screen being moved, while coupled to one another, in a periodically reversing fashion in the direction substantially perpendicular to the screen plane, and the sequence of the two-dimensional individual images being synchronized with the spatial position of the diffusion screen.

Three-dimensional images of a particularly high level of intensity can be produced by the moving of the imaging device together with the screen. The diameter of the imaging device, for example the diameter of a lens used as imaging device, advantageously corresponds here in essence to the dimensions of the two-dimensional images to be projected. By contrast with the apparatus described in U.S. Pat. No. 6,005,608, the imaging system of the present invention has no need for a pinhole that drastically restricts the intensity of the projection.

The imaging device and the diffusion screen are moved as a unit in a periodically reversing fashion.

In accordance with a first variant of the method according to the invention, here the distance between the diffusion screen and the imaging device, which corresponds in practice to the image width of the optical projection system, is substantially constant. However, since the object width changes continuously because of the periodically reversing movement of the unit composed of diffusion screen and imaging device, in the case of this variant the two-dimensional image is preferably projected onto the diffusion screen in a reduced fashion in order to minimize blurring of the imaging caused by the changing object width. It is advantageous here to select an object width that is in the range of five to ten times, preferably six to eight times the focal length of the optical imaging device.

As a result, in the event of a movement that is approximately of the order of magnitude of the focal length of the imaging device or somewhat below, the image width changes only slightly and the minimal instances of blurring occurring in the course of a period are of no consequence in practice.

In accordance with a second variant of the method according to the invention, the distance between the diffusion screen and the imaging device is adapted in each half period of the movement to the changing image width of the projection. Here, the coupled movement of imaging device and diffusion screen is compensated by a separate compensation movement of the imaging device, which can be determined using the conjugate distance equation of the optical system. Even given small object widths, an optimally sharp projection of the two-dimensional output image is possible with this variant independently of the instantaneous position of the diffusion screen such that a particularly compact 3-D monitor can be implemented. Again, given the use of a relatively highly resolving two-dimensional output image there is no need for the image to be reduced, or at least not strongly reduced.

According to the invention, the sequence of the two-dimensional individual images are calculated from the visible surface data of the three-dimensional objects to be illustrated. In accordance with one variant of the method according to the invention, here all the surfaces visible from different viewing angles can be projected. However, by way of example, in this variant front and rear sides of an object are visible virtually simultaneously as a result of the inertia of the human perception system. This effect can be entirely desirable in specific applications, for example, in the spatial display of radar data during air space monitoring. This effect does not disturb in practice in the display of realistic three-dimensional scenes, given that experiments with test subjects have shown that the object viewed is correctly detected even given a realistic projection of three-dimensional objects. Only when the test subjects have explicitly been advised that the normally invisible rear side is also to be seen did the test subjects succeed in focusing their look on the rear side of the object, and also in consciously perceiving the latter. If required, it is possible in accordance with one variant of the method according to the invention to take account of the position and the viewing angle of the viewer when calculating the visible surfaces, such that any optical artifacts can be excluded. In this case, either the viewer must essentially maintain a prescribed viewing angle and the object must be computationally rotated via a suitable control device if the viewer intends to view the object from different viewing angles, or the 3-D monitor has suitable means such as, for example, ultrasound sensors that enable the instantaneous position and thus the direction of view of the observer to be detected and also incorporated into the calculated display. Such additional measures are only necessary in extreme special cases, however.

In accordance with a particularly preferred variant of the method according to the invention, the sequence of the two-dimensional individual images is produced by means of a display composed of light emitting diodes (LED), which can be designed as a linear array or as a two-dimensional array. The particular advantage of the use of LEDs is to be seen in that owing to the transparent capsule acting as lens, on the LED, virtually the entire light emanating from the LED is emitted in a narrow solid angle and focused in a point on the diffusion screen by the imaging device provided according to the invention. Advances are thereby made, in conjunction with far lesser costs, into intensity ranges that can otherwise be achieved only with lasers.

A simple estimate shows that by using the apparatus according to the invention in conjunction with a two-dimensional display constructed from cost-effective LEDs, it is possible to produce substantially brighter three-dimensional images than the two-dimensional images generated by a conventional computer display screen. In a pixel of size $0.1$ mm$^2$, a conventional computer display screen has a power of approximately $0.1$ µW/mm$^2$ that is to say a total power of approximately $1000*1000*0.1$ µW=10 mW, something which clearly corresponds to an irradiation of approximately 100 Lux on a white sheet. For a 3-D monitor with moving diffusion screens, a pixel is active only approximately 1/500th of the time given a resolution of, for example, 500 pixels along the z-axis (depth). Consequently, given 500 pixels along the z-axis the intensity of the light source must already be $500*0.1$ µW/mm$^2$=50 µW/mm$^2$. However, this is already possible with the aid of simple cost-effective LEDs when their total power is concentrated onto one pixel. Even simple bright LEDs occupying the range of cents in terms of cost deliver a power of a few tenths of mW and, moreover, can conceivably be easily controlled.

If the aim is to implement no reduction of the LED display, or only a slight one, particularly small LEDs are preferred. It is particularly preferred then to design the LED array as an SMD (surface mounted) array.

An object of the invention is, furthermore, an apparatus for three-dimensional display of images, in particular a 3-D monitor that can be connected to a computer.

The apparatus according to the invention comprises image producing means for producing a sequence of two-dimensional output images on at least one LED array, an imaging device and a diffusion screen, that form a coupled, movable unit, actuating means for periodically moving the unit to and fro in a direction substantially perpendicular to the surface of the diffusion screen, control means for synchronizing the sequence of the two-dimensional output images with the spatial position of the diffusion screen, and, finally, means are provided in order to focus the light emanating from the LEDs of the array onto the imaging device that, for its part, focuses the light incident on it onto the diffusion screen. The movement amplitude of the diffusion screen perpendicular to its flat image surface in this case determines the spatial depth of the three-dimensional image displayed. The control means here control the sequence of the sequence of the two-dimensional output images reproduced by the image producing means such that individual images that in their sequence display the desired three-dimensional object are projected as a function of the instantaneous spatial position of the moving diffusion screen.

The image width of the imaging remains substantially constant owing to the movement of the imaging device and the diffusion screen as a coupled unit. Thus, when the two-dimensional output images are projected onto the diffusion screen in a reduced fashion, that is to say when the object width is substantially greater than twice the focal length, this arrangement yields a sharp and bright image over a large spatial depth of field. If the object width and the focal length of the imaging system are selected such that the output images are reduced only slightly or even magnified, there is preferably additionally superimposed on the coupled movement of the unit composed of imaging device and diffusion screen a correction movement of the imaging device that compensates at least partially the variation in the image width in accordance with the conjugate distance equation of the imaging system such that the two-dimensional output image can be projected sharply onto the diffusion screen over the entire spatial depth of the three-dimensional image displayed. It is preferred to provide for this purpose means that vary the distance between the imaging device and the diffusion screen as a function of the respective spatial position of the diffusion screen.

The movable diffusion screen is fashioned such that it scatters the projected images as uniformly as possible into as large a solid angle range as possible, such that the three-dimensional displays produced can be observed by the viewer from different viewing angles. The screen can be, for example, a semitransparent diffusion screen. Thus, for example, a roughened screen made from a transparent plastics material, for example made from an acrylic glass (PMMA) such as, for example, PLEXIGLAS®, or a thin roughened glass plate can serve as diffusion screen.

The image producing means are configured in such a way that a sequence of two-dimensional output images can be projected onto the movable diffusion screen via the imaging device. Here, the image producing means preferably comprise means for displaying two-dimensional output images, with particular preference a two-dimensional LED array. The individual LEDs of the array can be activated individually via the control device as a function of the instantaneous position of the movable diffusion screen. The use of a LED array is particularly preferred, since particularly luminous and contrasting three-dimensional image displays can be produced with the aid of such image producing means such that the three-dimensional images can be clearly perceived, for example even without darkening the room. In this case, the LEDs have a can be clearly perceived. In this case, the LEDs have as narrow an emission characteristic as possible such that virtually the entire emitted light can be projected by the imaging device onto the movable screen. Depending on the size of the LED array, it can be advantageous for LEDs that are further removed from the center of the array to be angled toward the imaging device in the direction of the optical axis.

In accordance with a variant of the apparatus according to the invention, the image producing means can also comprise a movable linear LED array that is, for example, moved in an oscillating fashion at high frequency in the image producing plane. Alternatively, the linear array can also be stationary, in which case, for example, an apparently two-dimensional output image is then generated via an arrangement of tiltable mirrors.

The LED array is preferably designed such that images are produced at at least three different wavelengths, preferably in the primary colors of red, green and blue (RGB), something which enables a color display of the three-dimensional images. For this purpose, each pixel element of the LED array can be composed of three differently colored LEDs. However, individual LEDs are also already known that have three individually switchable contacts that produce the three primary colors. Alternatively, it is also possible to provide three separate LED arrays that operate at three different wavelengths and which are superimposed via suitable mirrors, preferably via dichroic mirrors, and are thus projected onto the diffusion screen.

The intensity of the image projected onto the diffusion screen, preferably the intensity of each individual pixel, is controlled via the operating current strength and/or an adjustable temporal active/inactive ratio of the LEDs.

The most varied optical systems which enable the LED array to be projected onto the diffusion screen, that is to say, in particular, all types of lens systems, can be used as imaging device. It is preferred to select those lenses which are very light even given a large diameter such that, on the one hand, the masses to be moved are low whereas, on the other hand, it is ensured that as much light as possible passes onto the diffusion screen from the LED array via the lens system. The imaging device comprises a Fresnel lens with particular advantage. Such a lens is also light in conjunction with large dimensions and can be produced cost effectively according to specific requirements.

The apparatus according to the invention is distinguished by a high luminosity of the three-dimensional image produced. The invention provides for this purpose that virtually the entire light produced by the LEDs of the array is focused onto the movable imaging device. The means for focusing the light emanating from the LEDs of the array onto the imaging device can be differently fashioned:

In accordance with a first variant, the LEDs are enclosed in a transparent plastic or glass capsule that is designed such that the light produced by the LED leaves the capsule as a light beam that is only weakly diverging or—in the ideal case—is substantially parallel. When the moving imaging device, that is to say the moving Fresnel lens, for example, is at least of the same size as the LED array, the individual LEDs of the array can be arranged substantially parallel to one another, and therefore emit their substantially parallel light beams exactly in the direction of the movable Fresnel lens.

If, by contrast, the LED array is greater than the imaging lens, in accordance with another variant the LEDs of the array can be arranged in accordance with their position in the array in a fashion inclined such that, for example, even the LEDs located at the outer edge of the array emit their light beam in the direction of the movable imaging device. This variant is, however, more complicated in terms of production engineering.

Consequently, in accordance with a further variant it is possible to arrange directly upstream of the LED array a fixed collecting optic, for example once again a Fresnel lens, that focuses the parallel light beams emitted by the LEDs onto the movable imaging device.

In accordance with a particularly preferred variant, the LEDs of the arrays are designed as SMD array. It can be provided in this case to arrange directly upstream of the LEDs of the arrays a microlens array which, in turn ensures that the light emitted by the LEDs is focused onto the movable imaging device.

The movable masses can be greatly reduced by the use of Fresnel lenses in the movable imaging device and the use of a thin semitransparent diffusion screen. In order, nevertheless, to be able to guide the forces that occur as effectively as possible, it can be advantageous to arrange the apparatus according to the invention such that the unit composed of imaging device and diffusion screen can be moved to and fro substantially in the vertical direction. In a simple variant, the LED array is arranged here on the bottom of the apparatus, for example, and the optical axis of the apparatus runs virtually perpendicular to the bottom.

It can, moreover, be provided that the movable unit composed of imaging device and diffusion screen is coupled to one or more compensating bodies moved in direct opposition. Such an arrangement, which is kinematically comparable to the principle of the boxer motor, can be designed such that it is virtually free from force toward the outside, and so vibrations and the development of noise by the apparatus according to the invention can be largely minimized.

Because of the movable parts, it is advantageous when at least the diffusion screen is surrounded by a housing or at least a cylindrical protective ring with transparent walls such that it is possible to prevent observers of three-dimensional images from inadvertently invading the movement range of the screen. Filter foils that transmit in the visible spectral region only light of such a wavelength as produced by the LEDs of the array can be provided on the walls of the housing. It is thereby possible to prevent scattered light or reflections of the ambient light from penetrating to the outside from the housing and falsifying the observed three-dimensional image.

It is particularly advantageous for the housing to surround the entire movable unit.

It is advantageous for an underpressure to prevail in the housing as against the surroundings, that is to say the housing at least partially evacuated. Consequently, on the one hand the air resistance that has to be overcome during operation of the oscillating unit composed of imaging device and diffusion screen can be reduced, and on the other hand the noises caused mechanically during this movement and the propagation to the outside of these noises via sound waves can be largely suppressed.

As indicated above, the LED array is frequently imaged onto the diffusion screen in a reduced fashion. When, however, a linear magnification of 1:1 is implemented, that is to say when the image projected onto the diffusion screen is essentially as large as the LED array, it is possible in accordance with a further variant of the invention to interconnect a number of inventive apparatuses in modular fashion in a raster arrangement in order thus to implement an imaging system for a large three-dimensional image. The individual apparatuses of the imaging system are then controlled via a computer such that the assembled image of a larger scene can be produced, for example, the three-dimensional image of a football pitch or of a tennis court with a three-dimensional reproduction of the playing scenes in real time.

BRIEF DESCRIPTION OF THE DRAWINGS

The invention is explained in more detail below with reference to an exemplary embodiment illustrated in the attached drawing, in which.

DETAILED DESCRIPTION OF THE PREFERRED EMBODIMENTS

Figure 1:
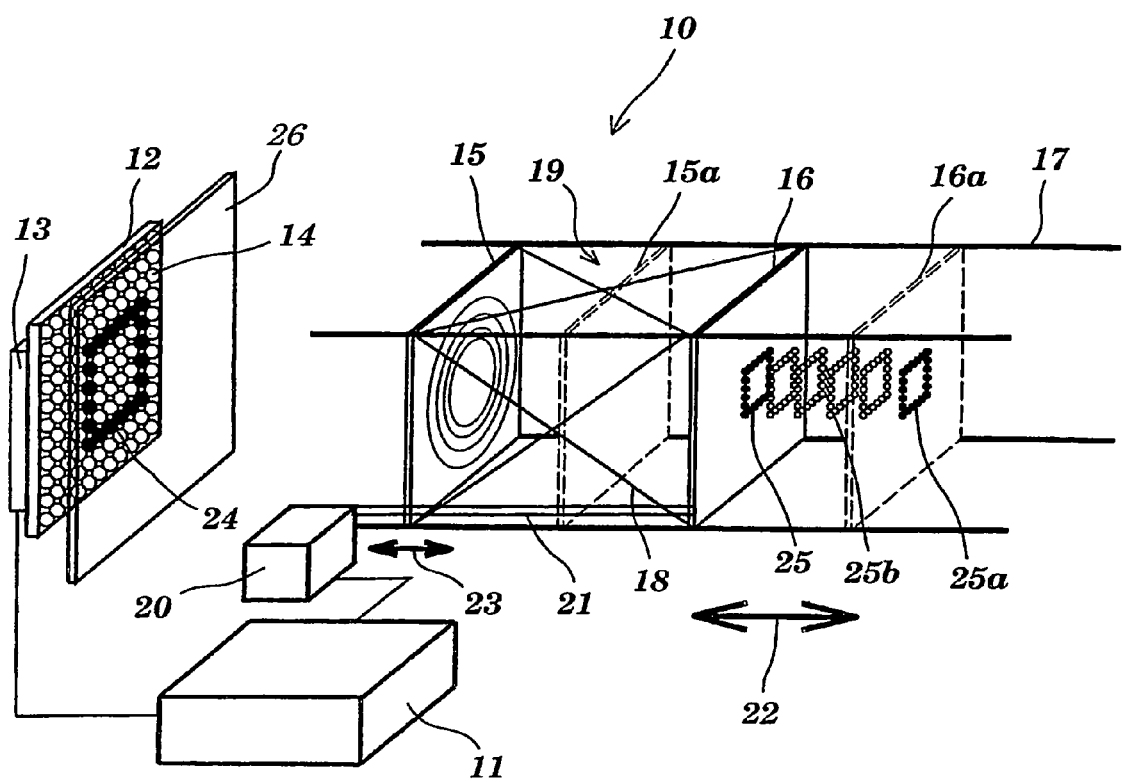
FIG. 1 shows a schematic of an embodiment of the apparatus according to the invention.

FIG. 1 shows a preferred embodiment of the apparatus according to the invention for three-dimensional display of images as a 3-D monitor 10 that is controlled via a computer 11. The 3-D monitor 10 has image producing means that are formed in the illustrated example by a stationary two-dimensional LED array 12 with associated control electronics 13. The control electronics 13 are driven, in turn, via the controller 11 that is, for example, connected to a computer (not illustrated) via an interface such as, for example, an USB interface. However, component 11 illustrated schematically in the drawing can also be a computer with an integrated controller. Each LED cell 14 of the array 12 can have individual LEDs for the three primary colors, or is preferably configured as an integrated LED that, as individual cell, can produce all three primary colors. The LED cells 14 are so small in this case that the imaging of the two-dimensional output image requires no reduction, or only a slight reduction, in order to obtain high resolution and sharp three-dimensional displays. For example, given 3:1 imaging it is possible to arrange 600×600 conventional, cost effective LED cells 14 on an area of 600×600 mm, something which then corresponds in the image to an acceptable pixel size of 0.3 mm ×0.3 mm.

An imaging device that is implemented as a Fresnel lens 15 of diameter 200 mm and a semitransparent diffusion screen 16 form a unit 19 that is coupled via guide rods 17 and connecting means 18 and, via a motor and transmission unit 20, is set into periodic movements perpendicular to the surface of the semitransparent diffusion screen 16 by means of a connecting rod 20, as is symbolized in FIG. 1 by the large arrow 22. If appropriate, the Fresnel lens 15 or else the diffusion screen can execute correction movements in each half period in order to compensate the changing object width as a function of the position relative to the diffusion screen 16, something which is symbolized in FIG. 1 by the small arrow 23. Again, the correction movement of the lens 15 can be implemented by a suitable configuration of the motor and transmission unit 20 and, if appropriate, a further connecting rod (not illustrated in FIG. 1) coupled to the lens 15, or suitable gear wheels. Small distortions owing to the different linear magnification can be compensated computationally by the pixel selection when constructing the image.

Thus, approximately 1/(22*600) sec, that is to say approximately 76 μsec is available for constructing a 2-D image. The active pixels are formed and transmitted as position and intensity data. The data volume will actively correspond as surface data of the 3-D bodies approximately to that of a two-dimensional display screen with all the pixels. Correspondingly fast digital interfaces are available as standard. A special digital/analogue module with latches and current setting is preferably developed for the current control by the LEDs. The lens 15 and diffusion screen 16 are preferably moved in a slight vacuum, the lens and ground glass screen are here preferably antireflection-coated and the image producing area is given a dark lining except for the LEDs and blocks other wavelengths than those of the three primary colors by means of filters such that even strong angled light is reproduced only weakly by the diffusion screen.

The instantaneous position of the unit 19 can, for example, be set actively by the control device 11 via the motor and transmission unit 20. A controllable stepping motor or another digitally addressable actuator, for example, can be used in this case. However, it is particularly preferred to operate the motor and transmission unit 20 at a constant rotational speed and to tap the instantaneous position of the unit 19 via a linear position pickup or an angular resolver that can then be evaluated via the control device 11. The last variant constitutes a particularly cost effective solution.

In the example illustrated, the unit 19 composed of Fresnel lens 15 and semitransparent diffusion screen 16 moves at a frequency of approximately 700 min$^{-1}$ and with a spatial amplitude of 200 mm in the direction of the guide rails 17 such that the resolution in this direction (z-axis of the three-dimensional image produced) is likewise at 600 points. The cage that connects the Fresnel lens 15 and the semitransparent diffusion screen 16 and is formed from the connecting elements 18 preferably consists of light and stable carbon fiber materials. Such an arrangement withstands mechanical loads of the order of magnitude of 36 g without any problems. Linear carriageways for the speeds of approximately 7 m/s that occur are likewise commercially available. The projection of a three-dimensional cuboid that is open at its end faces is indicated schematically in FIG. 1. Here, the LED array produces as two-dimensional output image 24 a luminous rectangle that is projected as image 25 onto the diffusion screen 16 via the lens 15. The unit 19 composed of lens 15 and diffusion screen 16 is moved to and fro periodically by the motor and transmission unit 20. Within this amplitude of the mechanical screen movement, the three-dimensional images are projected between the first extreme position, represented by solid lines, and the second extreme position, in which the lens 15a and the diffusion screen 16a are represented by dashes. The image 25a is projected onto the diffusion screen in the second extreme position. Of course, corresponding projections 25b of the output image 24, of which only four are indicated by the example in FIG. 1, are also produced between the extreme positions. It is immediately visible from this simple scheme how it is possible to generate complex three-dimensional scenes and moving three-dimensional images. Since the control device 11 knows the spatial position of the diffusion screen 16 at each instant, it is possible, for example, to produce a cuboid closed at the end faces in a simple way by virtue of the fact that instead of an outlined cuboid 24 a filled cuboid is projected onto the diffusion screen by the LED array 12 at the extreme positions of the illustration on the diffusion screen, that is to say at the positions indicated by the reference numerals 16 and 16a in FIG. 1.

The LED array 12 can be imaged directly onto the diffusion screen 16 by the movable Fresnel lens 15. This is possible without substantial light loss particularly when the individual LEDs 14 produce virtually parallel light beams because of their encapsulation. However, the light beams available from commercial LEDs are typically more or less divergent. Consequently, as likewise indicated in FIG. 1, a stationary Fresnel lens 26 that focuses onto the movable Fresnel lens 15 virtually all the light emanating from the LEDs 14 of the array can be arranged directly upstream of the LED array 12.

Figure 2:
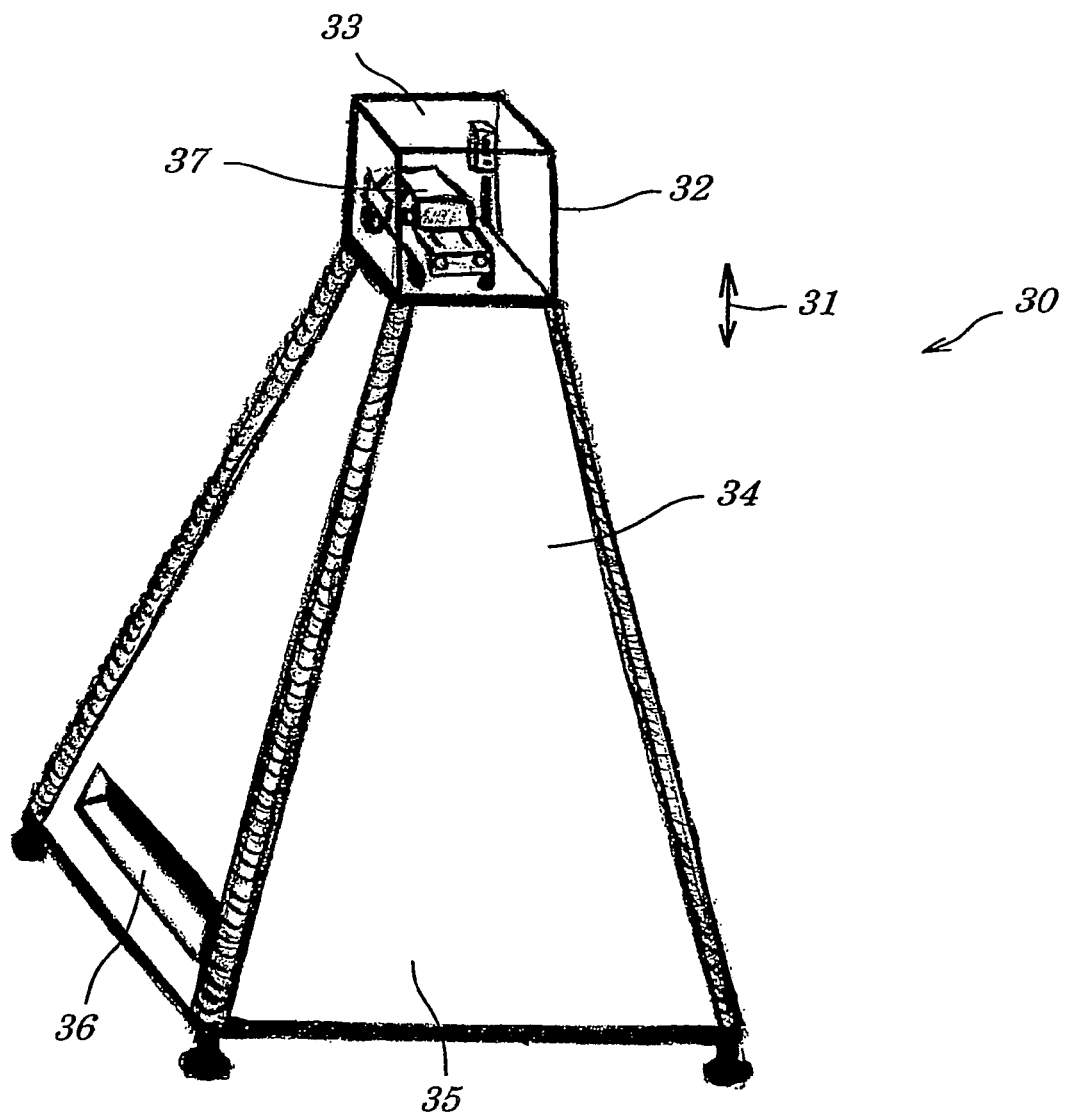
FIG. 2 shows a vertically oriented embodiment of the apparatus according to the invention.

FIG. 2 shows a possible practical implementation of the apparatus according to the invention as a 3 D monitor 30, in a perspective illustration. The optical design corresponds essentially to the illustration of FIG. 1. Whereas in FIG. 1 the optical axis runs horizontally, the optical axis is oriented vertically in relation to the floor in the embodiment of FIG. 2, that is to say, in particular, that the unit (not illustrated in separated fashion) composed of movable Fresnel lens and diffusion screen oscillates in the vertical direction symbolized by the arrow 31. The range of oscillation of the diffusion screen in surrounded by a transparent housing 32. The interior 33 of the housing 32 is evacuated to a pressure of a few mbar, in order to minimize the air resistance for the Fresnel lens and the diffusion screen, as well as to minimize the noise emissions. The remaining part of the apparatus are covered by opaque housing panels 34. The LED array (not detectable from outside) is located in the bottom area 35 of the 3 D monitor 30. Also provided in the variant illustrated is a connecting opening 36 via which, for example, memory cards with prerecorded films are inserted and can be replayed via an internal computer. Alternatively, the connecting opening 36 can also have an interface for connection to an external computer.

A schematic three-dimensional everyday scene 37 (a vehicle and traffic lights) that can be replayed with animation by the apparatus according to the invention is to be seen in the transparent housing 31 in the illustration of FIG. 2.

Figure 3:
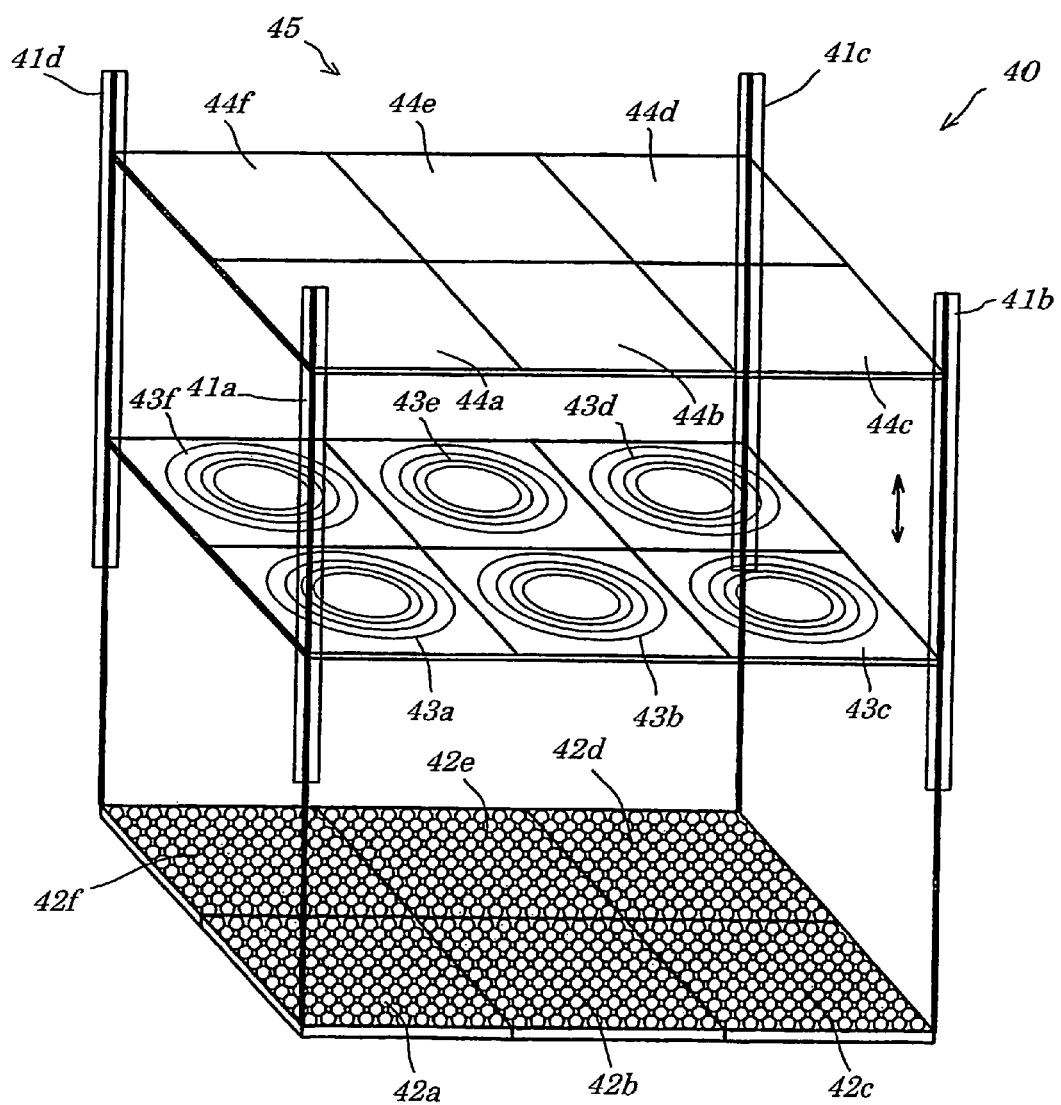
FIG. 3 shows an imaging system, assembled from a number of inventive apparatuses arranged in modular fashion, for producing large three-dimensional images.

FIG. 3 shows a schematic in which a number of apparatuses according to the invention and as described in more detail in FIG. 1 are connected in modular fashion to a three-dimensional large display screen 40. For the sake of clarity, only the outer guide rods 41a-d have been represented here. In this variant, the LED arrays 42a-f are projected onto the diffusion screens 44a-f with a linear magnification of 1:1 via the Fresnel lenses 43a-f. The diffusion screens produce a large image 45 overall. Such a display screen can be implemented with the aid of numerous modules, and can reach dimensions in the range of meters.

The invention claimed is:

1. A method for three-dimensional display of images, wherein a sequence of two-dimensional individual images are produced by means of a two-dimensional array of individually controllable light emitting diodes (LEDs), comprising:

focusing light emanating from the LEDs of the array onto an imaging device that focuses light incident on the imaging device onto a diffusion screen;

moving the imaging device and the diffusion screen, while coupled to one another and as a unit, in a periodically reversing fashion in a direction substantially perpendicular to the screen plane, while keeping the distance between the diffusion screen and the imaging device substantially constant by moving the diffusion and the imaging device at the same velocity; and synchronizing the sequence of the two-dimensional individual images with the spatial position of the diffusion screen.

2. The method as claimed in claim 1, including controlling the intensity of the image projected onto the diffusion screen via the operating current strength and/or adjustable temporal active/inactive ratios of the LEDs.

3. The method as claimed in claim 1, wherein the sequence of the two-dimensional individual images is calculated from the visible surface data of the three-dimensional objects that are to be displayed.

4. Apparatus for three-dimensional display of images, comprising:
- image producing means for producing a sequence of two-dimensional output images on at least one LED array;
- an imaging device and a diffusion screen;
- that form a coupled, movable unit, wherein the distance between the diffusion screen and the imaging device is kept substantially constant by moving the diffusion screen and the imaging device at the same velocity;
- actuating means for periodically moving the unit to and fro in a direction substantially perpendicular to the surface of the diffusion screen;
- control means for synchronizing the sequence of the two-dimensional output images with the spatial position of the diffusion screen; and means for focusing the light emanating from the LEDs of the array onto the imaging device, said imaging device focusing the light incident on it onto the diffusion screen.

5. The apparatus as claimed in claim 4, wherein three LED arrays produces output images at least three different wavelengths.

6. The apparatus as claimed in claim 5, including that three LED arrays operating at various wavelengths.

7. The apparatus as claimed in claim 6, wherein the output images produced by the three LED arrays are projected onto the diffusion screen via dichroic mirrors.

8. The device as claimed in claim 4, wherein the imaging device comprises a Fresnel lens.

9. The device as claimed in claim 4, wherein the means for focusing the light emanating from the LEDs of the array comprise a transparent capsule that surrounds each LED and produces a substantially parallel beam.

10. The device as claimed in claim 9, wherein the encapsulated LEDS are oriented toward the imaging device.

11. The apparatus as claimed in claim 9, including a fixed collecting optic that is arranged between the LED array and the movable unit.

12. The apparatus as claimed in claim 4, wherein the means for focusing the light emanating from the LEDS of the array comprise a microlens array that is arranged directly upstream of the LED array.

13. The apparatus as claimed in claim 4, wherein the movable unit is moved in a substantially vertical direction.

14. The apparatus as claimed in claim 4, wherein the unit is coupled to compensating bodies that are moved in direct opposition.

15. The apparatus as claimed in claim 4, wherein the diffusion screen is surrounded by a housing with transparent walls.

16. The apparatus as claimed in claim 15, wherein the walls of the housing are provided with filter foils that are transparent in the visible spectral region substantially only for the light produced by the LEDs.

17. The apparatus as claimed in claim 15, wherein the housing surrounds the entire movable unit.

18. The apparatus as claimed in claim 17, wherein an underpressure prevails in the housing.

19. An imaging system comprising a number of apparatuses as claimed in claim 4, arranged in a grid array that together produce a large three-dimensional image.

* * * * *